(12) United States Patent
Skrabs

(10) Patent No.: US 7,931,419 B2
(45) Date of Patent: Apr. 26, 2011

(54) CONNECTION OF A FIRST COMPONENT TO A SECOND CYLINDRICAL COMPONENT AND METHOD FOR MOUNTING OF THE FIRST AND SECOND COMPONENTS

(75) Inventor: Alfred Skrabs, Sitterswald (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 258 days.

(21) Appl. No.: 12/441,603

(22) PCT Filed: Sep. 3, 2007

(86) PCT No.: PCT/EP2007/059162
§ 371 (c)(1),
(2), (4) Date: Mar. 17, 2009

(87) PCT Pub. No.: WO2008/034711
PCT Pub. Date: Mar. 27, 2008

(65) Prior Publication Data
US 2009/0290933 A1    Nov. 26, 2009

(30) Foreign Application Priority Data
Sep. 20, 2006   (DE) .................. 10 2006 044 109

(51) Int. Cl.
*B25G 3/18*   (2006.01)
(52) U.S. Cl. .................. 403/329; 403/242; 403/364
(58) Field of Classification Search ............ 403/242, 403/274, 329, 354, 363, 364
See application file for complete search history.

(56) References Cited

U.S. PATENT DOCUMENTS

| | | | | |
|---|---|---|---|---|
| 3,221,466 A * | 12/1965 | Downing, Jr. et al. | ........... | 52/848 |
| 3,253,842 A * | 5/1966 | Rabe | ............... | 285/81 |
| 3,741,251 A * | 6/1973 | Rees | ........... | 138/96 R |
| 3,845,601 A * | 11/1974 | Kostecky | ........ | 52/290 |
| 4,887,929 A * | 12/1989 | Hale | .......... | 403/328 |
| 4,938,145 A * | 7/1990 | Martwick | ........ | 102/434 |
| 5,096,328 A * | 3/1992 | Knapp | ........... | 403/340 |
| 5,720,138 A * | 2/1998 | Johnson | ....... | 52/220.7 |
| 6,227,024 B1 | 5/2001 | Koestermeier | | |
| 6,467,817 B1 * | 10/2002 | Rhyman | ....... | 285/319 |
| 6,520,708 B1 * | 2/2003 | Jung et al. | ..... | 403/282 |
| 6,729,100 B2 * | 5/2004 | Koski et al. | ..... | 52/506.05 |
| 7,005,581 B2 * | 2/2006 | Burnette | ........ | 174/68.3 |
| 7,048,052 B2 | 5/2006 | Hackworth et al. | | |
| 7,168,486 B2 * | 1/2007 | Hackworth et al. | ..... | 166/242.6 |

FOREIGN PATENT DOCUMENTS

| | | |
|---|---|---|
| DE | 25 35 458 A1 | 2/1977 |
| DE | 25 48 581 A1 | 5/1977 |
| DE | 89 00 620 U1 | 10/1986 |
| DE | 43 13 648 A1 | 10/1994 |
| DE | 10 2004 005 091 A1 | 8/2005 |
| DE | 699 19 724 T2 | 9/2005 |
| DE | 20 2006 011 424 U1 | 3/2007 |

(Continued)

*Primary Examiner* — Joshua T Kennedy
(74) *Attorney, Agent, or Firm* — Davis & Bujold, P.L.L.C.

(57) ABSTRACT

A connection (4) of a first (2) to a second (3) cylindrical component for the transfer of circumferential and axial forces. The first component (2) has locking elements (9a) arranged on its circumference and at the end, the second component (3) has windows (12) associated with the locking elements (9a), and the first and second components (2, 3) can be plugged one into the other at the ends to form a positive interlock between the locking elements (9a) and the windows (12).

8 Claims, 3 Drawing Sheets

FOREIGN PATENT DOCUMENTS

| | | |
|---|---|---|
| EP | 0 840 050 A2 | 6/1998 |
| EP | 0 955 110 A2 | 11/1999 |
| GB | 2 174 447 A | 11/1986 |
| GB | 2 334 562 A | 8/1999 |
| GB | 2 371 574 A | 7/2002 |
| WO | 02/099284 A1 | 12/2002 |
| WO | 2005/115875 A1 | 12/2005 |

* cited by examiner

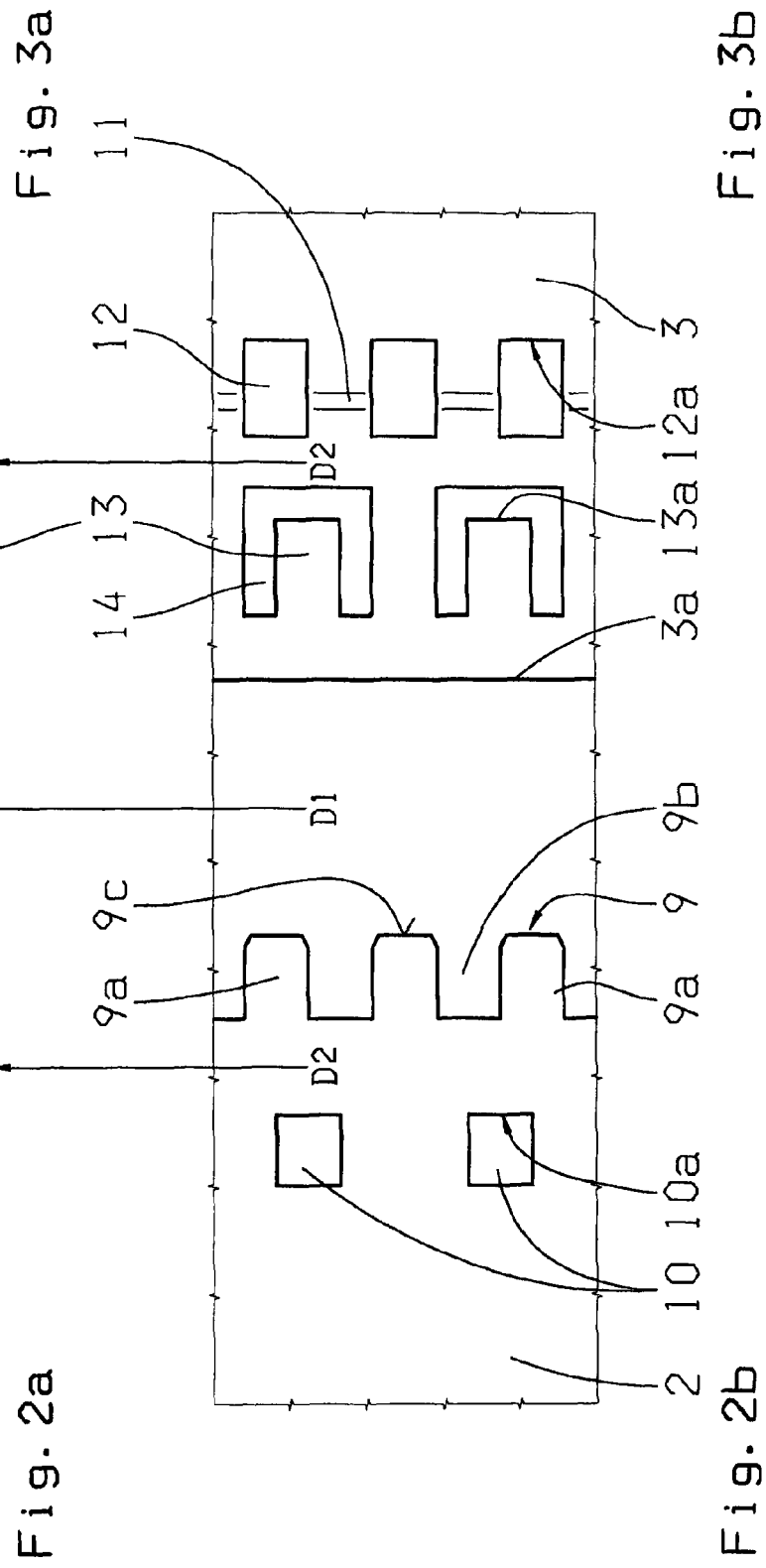

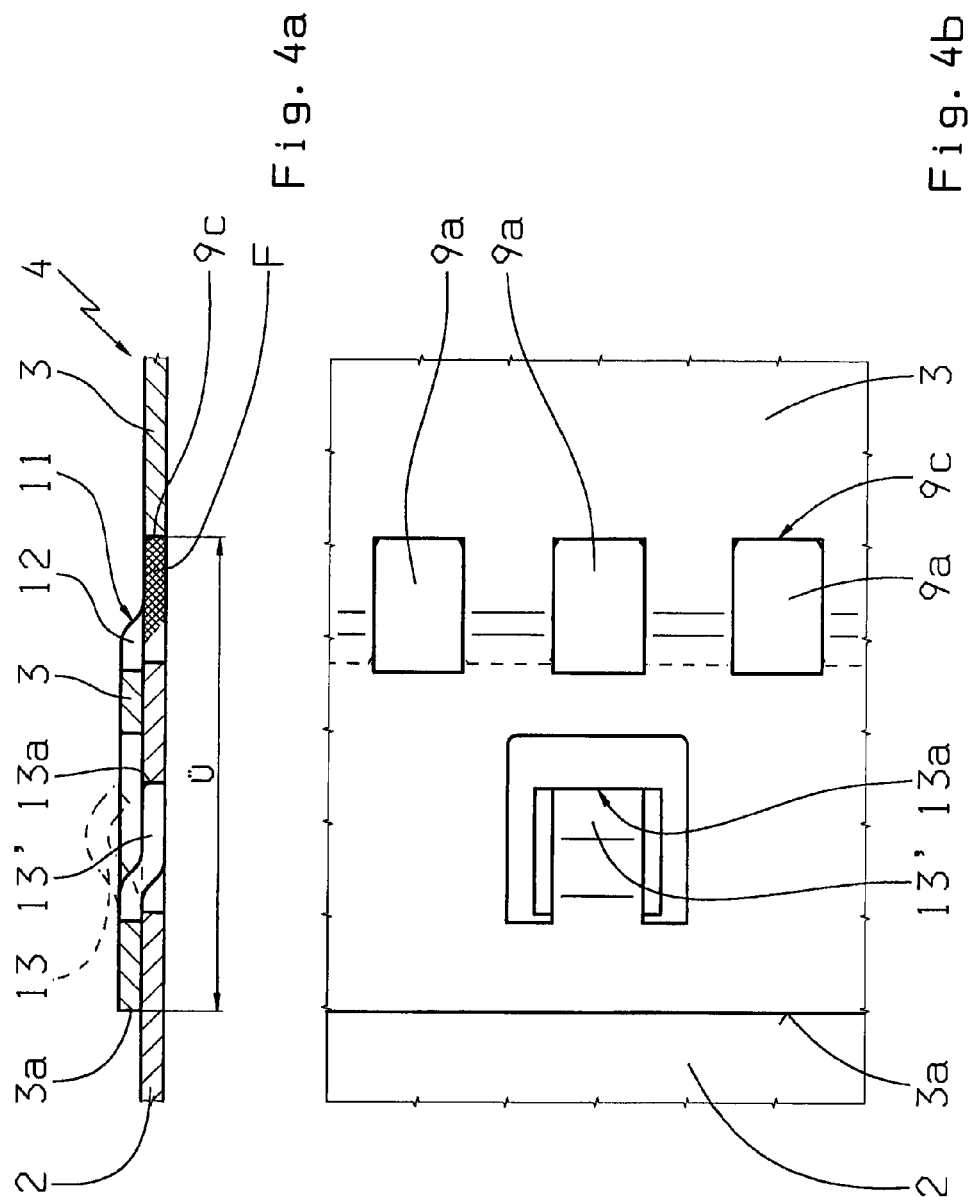

CONNECTION OF A FIRST COMPONENT TO A SECOND CYLINDRICAL COMPONENT AND METHOD FOR MOUNTING OF THE FIRST AND SECOND COMPONENTS

This application is a National Stage completion of PCT/EP2007/059162 filed Sep. 3, 2007, which claims priority from German application serial no. 10 2006 044 109.5 filed Sep. 20, 2006.

FIELD OF THE INVENTION

The invention concerns a connection of a first to a second cylindrical component and a method for assembling the two components.

BACKGROUND OF THE INVENTION

Cylindrical components, especially hollow cylinders, stepped cylinders or pot-shaped cylinders, are used for example in automatic transmissions for motor vehicles. Such cylinders accommodate planetary gearsets and/or shift elements in the form of clutches or brakes, and can also comprise internal or external teeth for connection to other components such as inner or outer disks. A component of this type is disclosed in the older, not previously published utility-model application DE 20 2006011424.6 by the present applicant as a cylinder, for example configured as an inner disk carrier. In that case the cylinder encloses a planetary gearset on the input side and two shift elements. Such a cylinder is produced as a deep-drawn component made from a deep-drawing steel, so that the length of the cylinder is limited by production technology considerations. In modern transmission developments cylindrical components are needed, whose axial length is larger than can be produced by conventional deep drawing methods. In such cases components of that type can be made by pressure rolling, a process known for example from DE 43 13 648 C2 or EP 0 955 110 B1. However, cylindrical components produced by pressure rolling are more expensive to manufacture.

SUMMARY OF THE INVENTION

The purpose of the present invention is to provide a cylindrical component of the required length, which can be produced inexpensively.

According to the invention a plug-in connection is provided between two cylindrical components which, together, form a component of longer axial length. The first component has locking elements arranged at its front end and the second component has corresponding windows into which the front-end locking elements can be plugged by axial movement. This produces a compact joint between two cylindrical components, which can transfer both circumferential forces and axial forces (in the compression direction). The two components form an overlap zone of larger wall thickness corresponding to the sum of the wall thicknesses of the two individual components. Compared with known connections, for example by interlocking teeth, the connection according to the invention is very small in the radial direction, i.e. it has advantages in relation to the radial space occupied.

The front-end locking elements are preferably formed as tabs which stand out relative to the cylinder body and so form end or crown teeth. The corresponding windows with which the crown teeth are brought into engagement are positioned in the second component in a transition zone from a larger to a smaller inside diameter. This enables the front-end teeth to be pushed in the axial direction into the windows until the front edges of the crown teeth encounter the windows. During this insertion process the two components are pushed toward one another through the overlap zone in a telescopic manner.

According to a preferred embodiment, in the overlap zone on the second component, i.e. the outer component, bracing tabs are cut free and on the first component, i.e. the component arranged on the inside, windows are cut out, in which the supporting tabs engage with interlock and thus transfer axial forces in the opposite direction (the tension direction). In this way the connection according to the invention can transfer axial forces in both directions, i.e. on the one hand by means of the end surfaces of the end teeth and on the other hand by means of the end surfaces of the bracing tabs.

According to a preferred embodiment the bracing tabs have an initial shape which allows the inner component to be pushed into the outer component. By pressing from outside, for example by means of a device, the initial shape is brought to a final shape which is made possible by a type of snap effect, i.e. from a convex to a slightly concave shape.

Alternatively, the bracing tabs can be made as springy tongues which, when the inner component is inserted, are first pushed outward and in the end position of the two components clip back into the windows in the manner of a catch connection. This variant allows assembly without any device that grips from the outside. The number of bracing tabs and front-end locking elements (crown teeth) is different: since the crown teeth also transfer circumferential forces while in contrast the bracing tabs do not, in a preferred embodiment about thirty crown teeth are provided, whereas for the bracing tabs only a smaller number are needed, which is matched to the axial forces to be transferred.

In an advantageous embodiment the two components can be made from different materials, these respective materials being chosen in accordance with the different demands on the first and second component.

In a preferred embodiment both components can be made as deep-drawn components. This has advantages in relation to production costs, especially compared with pressure rolling.

The connection according to the invention can be used particularly advantageously in motor vehicle automatic transmissions, i.e. for a cylinder composed of two part-cylinders in an automatic transmission for accommodating planetary gearsets and/or shift elements. In this application it is advantageous to make the first component, i.e. the first part-cylinder from a non-magnetizable material, for example aluminium, an aluminium alloy or an austenitic steel. This brings the advantage that a speed sensor that works by the well-known Hall effect can be arranged in the area of the first component, which is not possible with ordinary deep-drawing steels that can be magnetized. Thus, the sensor can detect the rotation speed of a transmission component such as a carrier shaft of a planetary gearset.

According to the method, the two components are orientated end-to-end and pushed one into the other until the front faces of the crown teeth encounter the windows of the other component. Then, locking takes place by the bracing tabs in the other, opposite axial direction. Here, two variants are possible: the first provides that the bracing tabs are pressed into the windows of the other component by means of a device which grips from the outside, and during this the bracing tabs snap from a convex initial shape to a concave final shape, thereby axially bracing the two components together.

In a second, preferred variant the axial locking takes place automatically, i.e. the bracing tabs made as elastic tongues spring inward when the inner component has been inserted, and clip into the windows. No other device is needed for this.

BRIEF DESCRIPTION OF THE DRAWINGS

An example embodiment of the invention is illustrated in the drawing and will be described in greater detail below.

The figures show:

FIG. 2a: Partial section through the first part-cylinder FIG. 2b: Partial view of the first part-cylinder in the direction A FIG. 3a: Partial section through the second part-cylinder FIG. 3b: View of the second part-cylinder in the direction B FIG. 4a: Connection of the two part-cylinders according to the invention, showing the detail X in FIG. 1

FIG. 4b: Another view of the detail X.

DETAILED DESCRIPTION OF THE PREFERRED EMBODIMENTS

Figure 1:
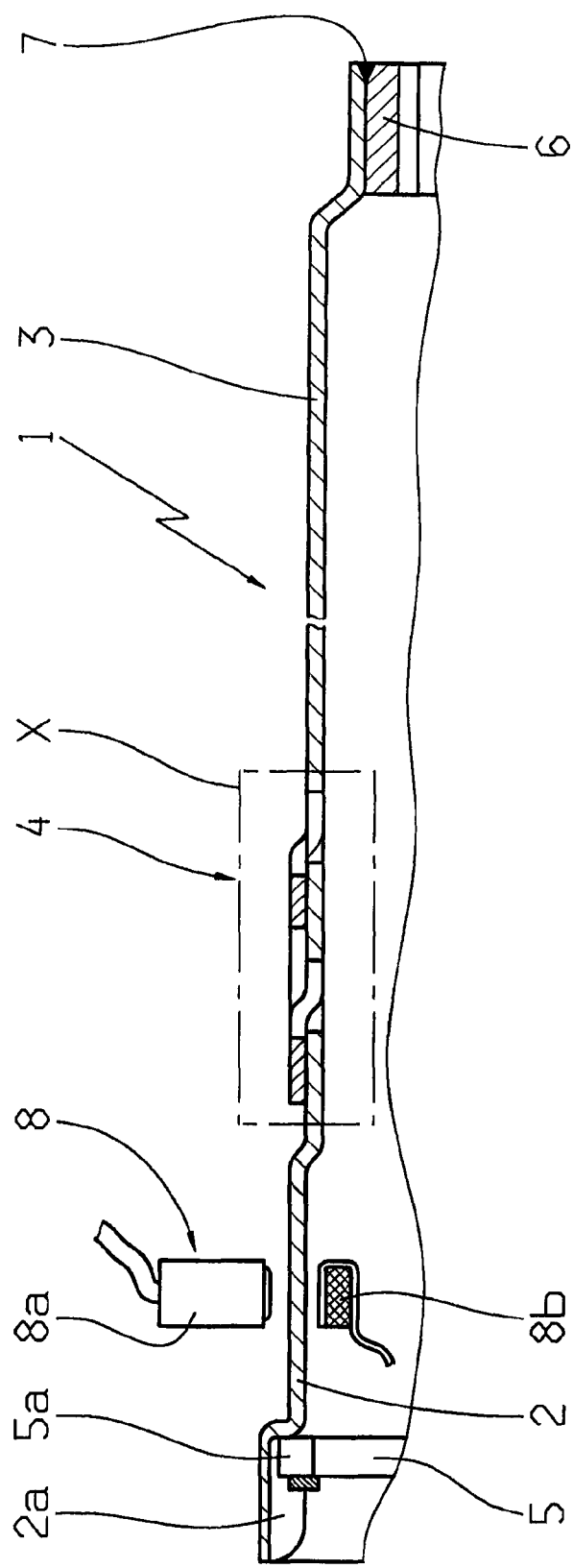
FIG. 1: A cylinder, consisting of a first and a second part-cylinder, for an automatic transmission

FIG. 1 shows an axial section through a cylinder 1 that can be used in an automatic transmission of a motor vehicle to accommodate a planetary gearset and shift elements (none of them shown). The cylinder 1 is composed of two part-cylinders, a first part-cylinder 2 and a second part-cylinder 3, which are connected firmly to one another by a plug-in joint 4. In the outer, end area of the part-cylinder 2 is arranged a guide disk 5, which is connected to the first part-cylinder 2 by means of locking teeth 5a, 2a. The guide disk 5 is part of the planetary gearset (not shown). At the opposite end of the cylinder 1 a ring gear 6 is connected fixed to the part-cylinder 3, i.e. by means of a weld seam 7, although locking teeth would also be possible in place of the weld seam 7. In the area of the first part-cylinder 2 is arranged a speed sensor 8 which consists of a static sensor component 8a positioned outside the part-cylinder 2 and a rotating magnetic ring 8b arranged inside the first part-cylinder 2. The first part-cylinder 2, which is therefore between the sensor component 8a and the rotating magnetic ring 8b, is made from a non-magnetic material, preferably aluminium, an aluminium alloy or an austenitic steel such as V4A. Thus the speed sensor 8, which works according to the well-known Hall effect, is functional. The second part-cylinder 3 is made from an ordinary commercial deep-drawing steel and can therefore be welded to the ring gear 6. Preferably, both part-cylinders 2, 3 are deep-drawn components, i.e. made by deep drawing from a sheet blank.

FIGS. 2a and 2b show, respectively, the first part-cylinder 2 in section and seen from above (in the direction A). At the front, i.e. in the area of the joint 4 (FIG. 1) the first part-cylinder 2 has end- or crown-teeth 9, consisting of tabs or teeth 9a chamfered at the end, with gaps 9b arranged between them. Furthermore, on the circumference of the part-cylinder 2 are arranged rectangular or square openings in the form of windows 10, whose purpose will be explained below.

FIGS. 3a and 3b show the part-cylinder 3 in section and seen from above (in the direction B). The second part-cylinder 3 has a front edge 3a and, in its end area, an inside diameter D1 which corresponds to the outside diameter of the first part-cylinder 2, and a reduced inside diameter D2 which corresponds to the inside diameter D2 of the first part-cylinder 2. The transition from the larger inside diameter D1 to the smaller inside diameter D2 is shown as a beveled section 11. In the area of the beveled section 11, distributed around the circumference, rectangular openings in the form of windows 12 are cut out of the cylinder surface of the second part-cylinder 3, the width of these windows (in the circumferential direction) corresponding to the width of the teeth 9a of the end tooth array 9 of the first part-cylinder 2. In addition, in the cylinder surface of the second part-cylinder 3 tongues 13, so-termed bracing tabs, are cut free, i.e. they are surrounded by an approximately U-shaped gap 14. As can be seen in FIG. 3a the bracing tabs, seen in cross-section, are convexly curved and project outward a little above the gap opening 14. The form of the bracing tabs 13 illustrated is a so-termed initial shape, i.e. a shape before the two part-cylinders 2, 3 are assembled together. This enables the first part-cylinder 2 to be pushed in the axial direction into the second part-cylinder 3, so that the slightly chamfered teeth 9a can engaged with the windows 12. The windows 12 have abutment surfaces 12a against which the ends 9c of the teeth 9 come into contact.

FIGS. 4a and 4b show the detail X from FIG. 1, i.e. the connection 4 of the two part-cylinders 2, 3, on an enlarged scale. The same parts are given the same indexes. The front-end areas of the part-cylinders 2, 3 pushed into one another form an overlap zone ü which extends from the front surfaces 9c of the end teeth 9 as far as the front edge 3a of the second part-cylinder 3. The initial shape of the bracing tab 13 is here shown by broken lines. The bracing tab 13 is pressed inward by a device (not shown) to position 13' (continuous line) so that its front surface 13a presses against the corresponding contact surface 10a of the window 10, whereby the two part-cylinders 2, 3 are axially braced. This joint by the bracing tabs 13' of the second part-cylinder 3 can transfer axial tensile forces between the two part-cylinders 2, 3. Compression forces in the axial direction are transferred by the end teeth 9. Circumferential forces between the two part-cylinders 2, 3 are also transferred by the end teeth 9, but via the lateral surfaces of the teeth 9a which, in FIG. 4a, are shown as a cross-hatched area F.

As a variation from the example embodiment illustrated, the bracing tabs 13 can also be made as elastically springy tongues which, when the first part-cylinder is inserted into the second part-cylinder, are first pushed outward by the end surface of the first part-cylinder and—when the end faces 9c have come up against the abutment surfaces 12a—spring back into the windows 10.

Indexes

1 Cylinder
2 First part-cylinder
2a Locking teeth
3 Second part-cylinder
3a Front edge
4 Connection (between the first and second part-cylinders)
5 Guide disk
5a Locking teeth
6 Ring gear
7 Weld seam
8 Speed sensor
8a Sensor component
8b Magnetic ring
9 End teeth
9a Tooth
9b Gap
9c End surface
10 Window
11 Beveled section
12 Window
12a Abutment surface
13 Bracing tab
13' Bracing tab (final shape)
14 Gap
D1 Outside diameter (first part-cylinder)
D2 Inside diameter (first part-cylinder)
F Force transfer area
ü Overlap zone

The invention claimed is:

1. A connection of a first cylindrical component to a second cylindrical component for transfer of circumferential and axial forces comprising:

the first component (2) having locking elements (9) formed around a circumference at a front end thereof and forming a tooth array (9);

the second component (3) having windows (12) arranged spaced from a front end thereof for engagement with the locking elements (9);

the front ends of the first and the second cylindrical components (2, 3) being matingly engaged to one another to produce an interlocking engagement between the locking elements (9) and the windows (12) of the second component (3);

the locking elements (9) comprising locking tabs (9a, 9c) that project from the first cylindrical component (2) and, following mating engagement, abut against the windows (12, 12a) of the second component (3) so as to prevent further insertion of the first component (2) into the second component (3) and facilitate transfer of axial compression forces;

the second component (3) having bracing tabs (13) distributed around and cut from a circumferential surface thereof in an axial overlap zone (u) defined between the front ends of the first and the second components following mating engagement;

the first component (2) having respective windows (10) for matingly engaging with the bracing tabs (13) of the second component (3); and the bracing tabs (13), following mating engagement, being interlocked with the windows (10) of the first component (2) and thereby facilitating transfer of axial tensile forces.

2. The connection according to claim 1, wherein the windows (12) of the second component (3) are spaced from the front end edge (3a) of the second component (3).

3. The connection according to claim 1, wherein in the overlap zone (ü) the second component (3) is an outer component with a first inside diameter (D1) of the second component (3) which is larger than an outside diameter of the first component (2), and in an area of the widows (12) the first inside diameter (D1) of the second component is reduced to a second inside diameter (D2) of the second component which corresponds to an inside diameter of the first component (2).

4. The connection according to claim 1, wherein end faces (9c) of the locking tabs (9a) abut against abutment surfaces (12a) of the windows (12) of the second component and for transferring axial forces in a compression direction, and form transfer surfaces (F) for the transfer of circumferential forces.

5. The connection according to claim 4, wherein the bracing tabs (13) are in the form of spring biased tongues which, once the first and the second cylindrical components (2,3) are matingly engaged spring back from a first position toward a normally biased second position and lock with the widows (10) of the first component (2).

6. The connection according to claim 1, wherein the bracing tabs (13) have an initial shape from which the bracing tabs (13) are deformed into a final shape (13').

7. The connection according to claim 1, wherein engagement between the bracing tabs (13, 13a) and the windows (10) of the first component (20) prevent the first component (20) from being axially separated from the second component (3).

8. A coupling which transfers both rotation and axial forces between a first cylindrical component and a second cylindrical component, the coupling comprising:

an end portion of the first cylindrical component (2) having a plurality of crown teeth (9a) extending axially therefrom and a plurality of windows (10), the first cylindrical component (2) having an inner radius (D2) and an outer radius (D1);

the second cylindrical component (3) having a first end section with an inner radius (D1) that is substantially equal to the outer radius (D1) of the first cylindrical component (2), a second end section having an inner radius (D2) that is substantially equal to the inner radius (D2) of the first cylindrical component (2) and a beveled section connecting the first and the second end sections of the second cylindrical component (3);

the second cylindrical component (3) having a plurality of bracing tabs (13) distributed about a circumference of the first end section and a plurality of windows (12) distributed about a circumference of the second cylindrical component (3) that axially extend from the first end section to the second end section of the second cylindrical component (3) such that one side of each of the plurality of windows (12) is located within the first end section of the second cylindrical component (3) and one opposite side of each of the plurality of windows (12) is located within the second end section of the second cylindrical component (3);

when coupled, the end portion of the first cylindrical component (2) is located within the first end section of the second cylindrical component (3) and the plurality bracing tabs (13) are axially and radially aligned with the plurality of windows (10) of the first cylindrical component (2) such that remote ends of the plurality of bracing tabs (13) are axially engagable with the plurality of windows (10) of the first cylindrical component (2) to transfer axial forces between the first cylindrical component (2) and the second cylindrical component (3); and when coupled, the plurality of crown teeth (9a) abut axial sides and the opposite sides of the plurality of windows (12), which are located within the beveled and the second end sections of the second cylindrical component (3), to transfer radial and axial forces between the first cylindrical component (2) and the second cylindrical component (3).

* * * * *